H. Wendt,
Shears.
№ 39,693. Patented Aug. 25, 1863.
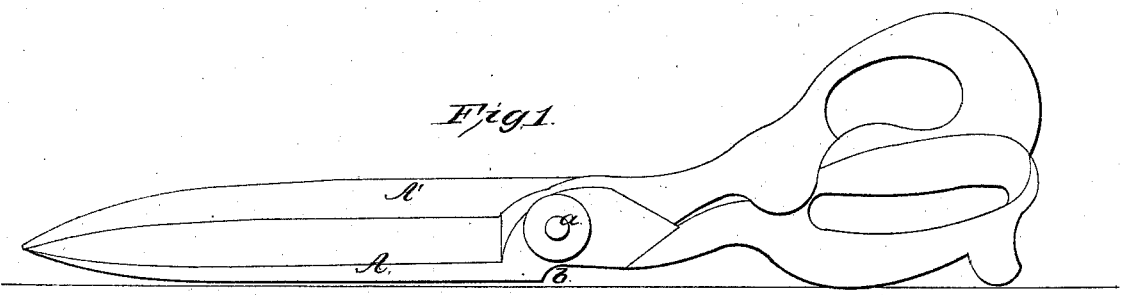
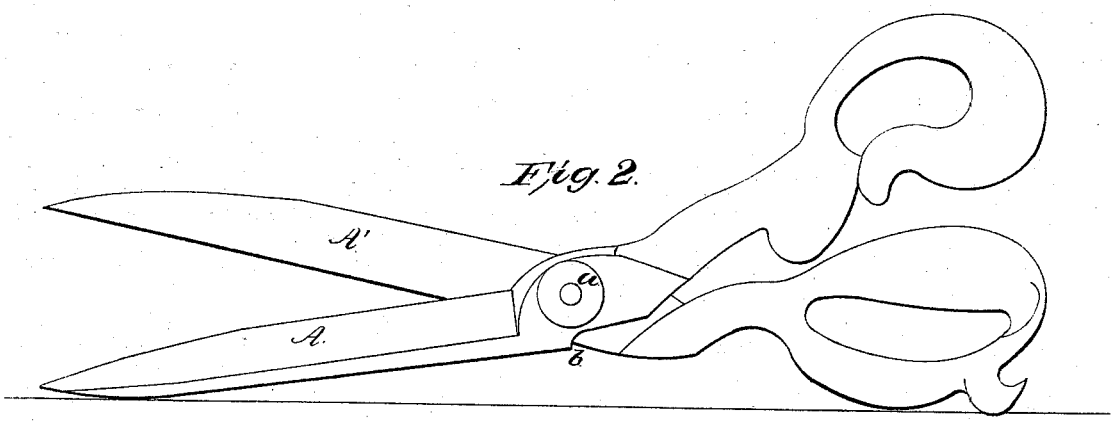
Witnesses:
George M. Seymour,
Christian Peters
Inventor:
Hermann Wendt

UNITED STATES PATENT OFFICE.

HERMANN WENDT, OF ELIZABETH, NEW JERSEY.

IMPROVEMENT IN TAILORS' SHEARS.

Specification forming part of Letters Patent No. 39,693, dated August 25, 1863.

*To all whom it may concern:*

Be it known that I, HERMANN WENDT, of Elizabeth, in the county of Union and State of New Jersey, have invented a new and useful Improvement in Tailors' Shears; and I do hereby declare that the following is a full, clear, and exact description of the same, reference being had to the accompanying drawings, forming a part of this specification, in which—

Figure 1 represents a side elevation of my invention when closed. Fig. 2 is a similar elevation of the same when partially opened.

Similar letters of reference indicate corresponding parts in both views.

This invention consists in tailors' shears the lower blade of which is formed with a recess or shoulder in such a manner that the cutting-edge of said blade can be brought down in line, or nearly so, with the pivot connecting the two blades without unduly weakening said blade, and that by this construction of the shears a draw cut is produced, enabling the operator to work the shears with the greatest ease, and to have the full benefit of the cutting-edge from heel to point.

To enable others skilled in the art to make and use my invention, I will proceed to describe it.

My shears are composed of two blades, A A', which are made of steel or any other suitable material or materials and connected by a pivot, $a$, in the usual manner. The shape of the upper blade, A', is similar to that of ordinary shears, but the cutting-edge of the lower blade, A, is brought in line, or nearly so, with the pivot $a$, and in order to preserve the requisite strength it is provided with a shoulder or recess, $b$. This recess is situated under the pivot, or nearly so, and a corresponding rise in the upper part of the blade over the pivot gives room to place the pivot in line, or nearly so, with the cutting-edge of said blade. The full strength of the blade is thus preserved, and by the relative position of the two cutting-edges toward each other, a draw cut is produced, so that the shears can be operated with the greatest ease, and that the operator has the full benefit of the cutting-edge from heel to point.

What I claim as new, and desire to secure by Letters Patent, is—

Tailors' shears the lower blade, A, of which is formed with a shoulder or recess, $b$, as and for the purpose shown and described.

HERMANN WENDT.

Witnesses:
 G. B. WHITTLESEY,
 GEO. M. SEYMOUR.